(12) United States Patent
Raja et al.

(10) Patent No.: US 9,886,450 B2
(45) Date of Patent: Feb. 6, 2018

(54) SYSTEM AND METHOD FOR SUPPORTING ZERO-COPY BINARY RADIX TREE IN A DISTRIBUTED COMPUTING ENVIRONMENT

(71) Applicant: Oracle International Corporation, Redwood Shores, CA (US)

(72) Inventors: Harvey Raja, Manchester (GB); Cameron Purdy, Burlington, MA (US); Gene Gleyzer, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 285 days.

(21) Appl. No.: 14/865,666

(22) Filed: Sep. 25, 2015

(65) Prior Publication Data

US 2016/0092466 A1  Mar. 31, 2016

Related U.S. Application Data

(60) Provisional application No. 62/055,483, filed on Sep. 25, 2014, provisional application No. 62/055,494, filed on Sep. 25, 2014.

(51) Int. Cl.
  *G06F 17/30* (2006.01)
(52) U.S. Cl.
  CPC .. *G06F 17/30194* (2013.01); *G06F 17/30218* (2013.01); *G06F 17/30324* (2013.01); *G06F 17/30327* (2013.01)
(58) Field of Classification Search
  CPC ......... G06F 17/30194; G06F 17/30218; G06F 17/30324; G06F 17/30327

USPC .......................................................... 707/742
  See application file for complete search history.

(56) References Cited

U.S. PATENT DOCUMENTS

| 5,857,196 | A | 1/1999 | Angle et al. |
| 6,381,676 | B2 | 4/2002 | Aglietti |
| 6,694,323 | B2 * | 2/2004 | Bumbulis ......... G06F 17/30327 |
| 7,028,158 | B1 | 4/2006 | Beatty |
| 7,706,386 | B2 | 4/2010 | Ma |
| 7,895,260 | B2 * | 2/2011 | Archer ...................... G06F 9/52 |
| | | | 709/201 |

(Continued)

OTHER PUBLICATIONS

Zou, Xukai, et al., Secure Group Communications Over Data Networks, Springer Business+Science Media, Inc., New York, NY, © 2005, "Chapter 3: Tree Based Key Management Schemes", pp. 49-89.*

(Continued)

*Primary Examiner* — Robert Stevens
(74) *Attorney, Agent, or Firm* — Tucker Ellis LLP

(57) ABSTRACT

A system and method supports key management in a distributed computing environment such as a distributed data grid. A binary radix tree is used to intern a plurality of binary keys. The binary radix tree is serialized to a byte buffer and a view of the binary is created. A byte sequence interface to the nodes of the serialized binary radix tree allows use of references which refer to positions in the serialized binary radix tree instead of requiring byte array copes of the interned keys. Use of references into the byte array in place of a byte array copies of interned keys reduces the memory overhead associated with referrers such as reverse indices which make reference to values associated with the plurality of binary keys. The reduction in memory overhead enhances performance and capabilities of a distributed computing environment such as a distributed data grid.

20 Claims, 7 Drawing Sheets

(56) References Cited

U.S. PATENT DOCUMENTS

| | | | |
|---|---|---|---|
| 8,977,600 | B2 | 3/2015 | Crupi |
| 9,021,050 | B2 | 4/2015 | Shaver |
| 2006/0036426 | A1 | 2/2006 | Barr et al. |
| 2006/0059196 | A1* | 3/2006 | Sato .................. G06F 17/30985 |
| 2007/0150690 | A1 | 6/2007 | Chen |
| 2008/0114735 | A1* | 5/2008 | Salemink .......... G06F 17/30327 |
| 2009/0099342 | A1 | 4/2009 | Braconnot |
| 2010/0011283 | A1 | 1/2010 | Wray |
| 2012/0222005 | A1 | 8/2012 | Harris |

OTHER PUBLICATIONS

Ng, Wee Hock Desmond, et al., "Dynamic Balanced Key Tree Management for Secure Multicast Communications", IEEE Transactions on Computers, vol. 56, No. 5, May 2007, pp. 590-605.*

European Patent Office, International Searching Authority, International Search Report and Written Opinion dated Dec. 22, 2015 for International Application No. PCT/US2015/052458, 17 pages.

Satish Palaniappan, "Efficient data transfer through zero copy Zero copy, zero overhead", © Copyright IBM Corporation 2008, Sep. 2, 2008, 10 pages.

Hrishikesh Amur et al., "Memory-Efficient GroupBy-Aggregate using Compressed Buffer Trees", Proceedings of the $4^{th}$ Annual Symposium on Cloud Computing, SoCC '13, Jan. 1, 2013, 16 pages.

Harvey Raja, "Elastic Data", Mar. 21, 2013, retrieved from: <https://coherence.java.net/assets/pdf/2013-03-21-Harvey-Raja-Elastic-Data-Overview.pdf> retrieved on Mar. 23, 2015, 26 pages.

United States Patent and Trademark Office, Notice of Allowance and Fee(s) Due dated Nov. 17, 2017 for U.S. Appl. No. 14/865,661, 9 Pages.

* cited by examiner

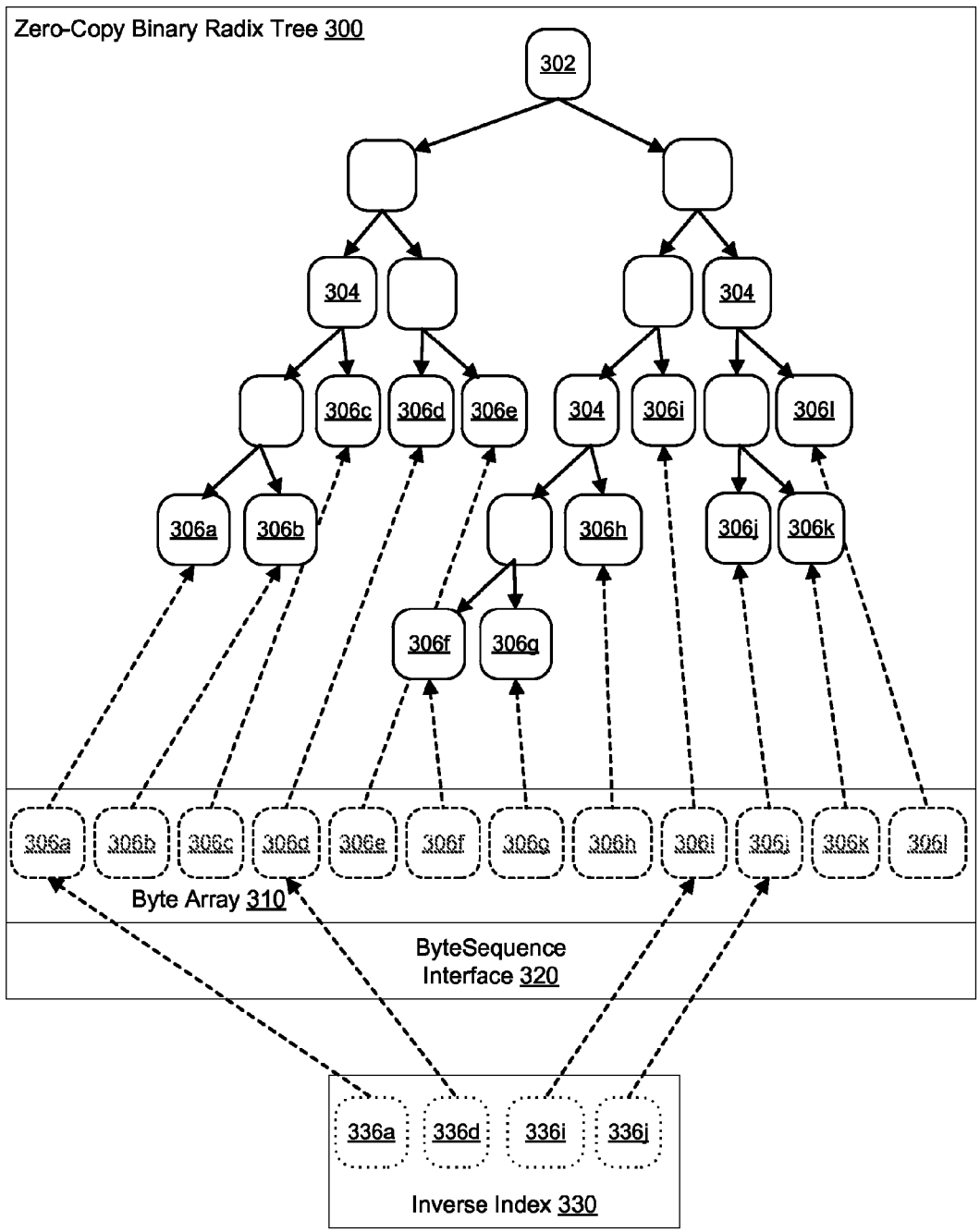

SYSTEM AND METHOD FOR SUPPORTING ZERO-COPY BINARY RADIX TREE IN A DISTRIBUTED COMPUTING ENVIRONMENT

CLAIM OF PRIORITY

This application claims priority to U.S. Provisional Patent Application No. 62/055,483, entitled "SYSTEM AND METHOD FOR SUPPORTING ZERO-COPY BINARY RADIX TREE IN A DISTRIBUTED COMPUTING ENVIRONMENT" filed Sep. 25, 2014, and U.S. Provisional Patent Application No. 62/055,494, entitled "SYSTEM AND METHOD FOR SUPPORTING A REFERENCE STORE IN A DISTRIBUTED COMPUTING ENVIRONMENT" filed Sep. 25, 2014, which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a distributed computing environment.

CROSS REFERENCE TO RELATED APPLICATION

The application is related to U.S. patent application Ser. No. 14/865,661 entitled "SYSTEM AND METHOD FOR SUPPORTING A REFERENCE STORE IN A DISTRIBUTED COMPUTING ENVIRONMENT" filed Sep. 25, 2015, which application is incorporated herein by reference.

SUMMARY

In embodiments, the present disclosure describes systems and methods that can support key management in a distributed computing environment. The system can use a binary radix tree to intern a binary key, wherein the binary key is referred to by a plurality of referrers in the distributed computing environment. Furthermore, the system can provide a reference to a node in the binary radix tree that is associated with the binary key referred to by the plurality of referrers in the distributed computing environment. Then, each said referrer can use the reference to the node in the binary radix tree to realize the binary key without a need for maintaining a copy of the binary key locally.

Also, described herein are systems and methods that can support a reference store in a distributed computing environment. The system can associate a ticket with a reference store, wherein the reference store contains a plurality of references. Furthermore, the system can use the ticket to expose the reference store to one or more consumers in the distributed computing environment. The reference store can be inflated or deflated in response to the number of references required to be stored. Additionally, the system can signal said one or more consumers with regard to one or more changes occurred to the reference store.

These and other objects and advantages of the present invention will become apparent to those skilled in the art from the following description of the various embodiments, when read in light of the accompanying drawings.

BRIEF DESCRIPTION OF THE FIGURES

FIG. 3A illustrates a zero-copy binary radix tree in a distributed computing environment, in accordance with an embodiment of the invention.

DETAILED DESCRIPTION

Figure 1:
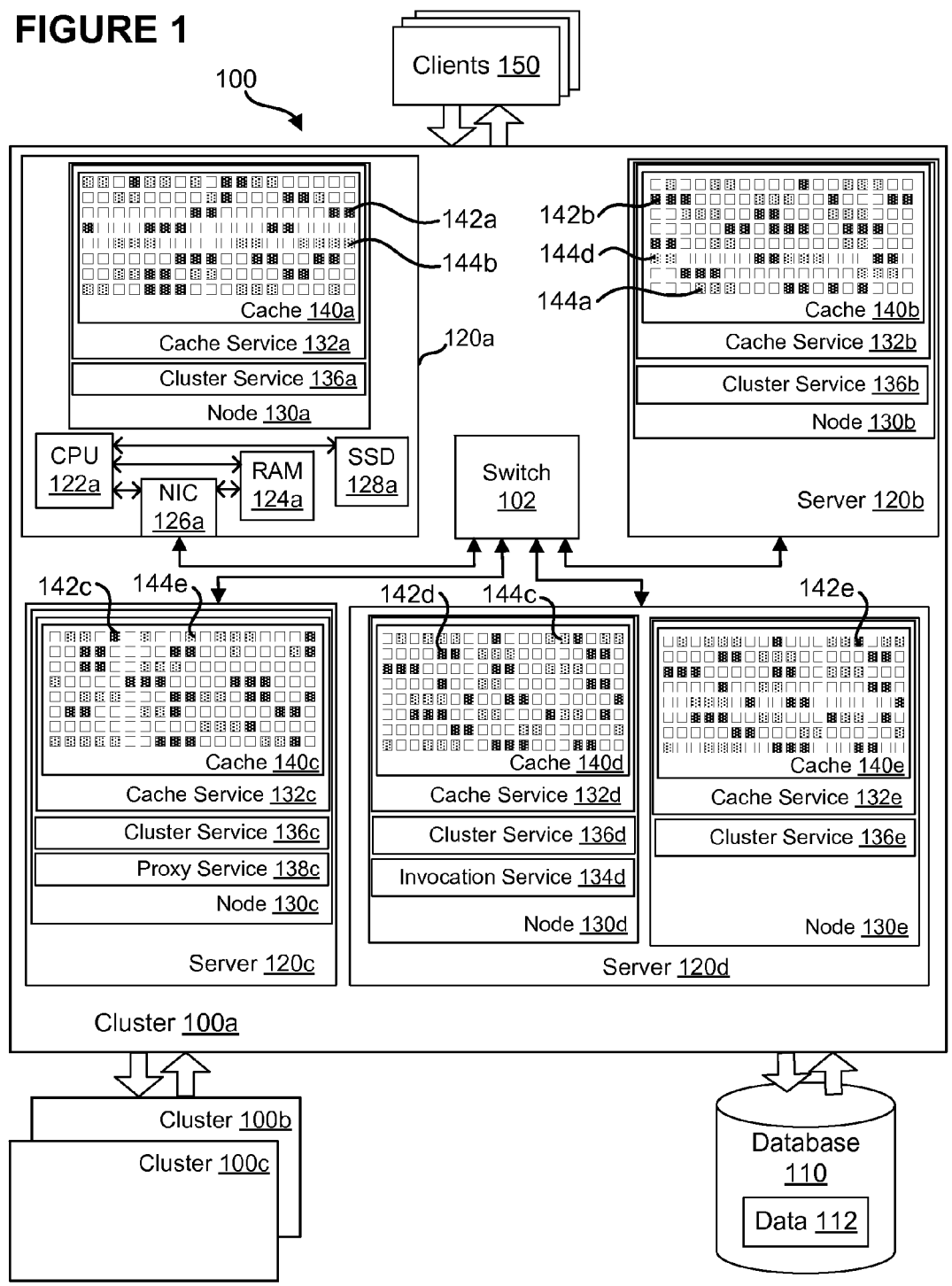
FIG. 1 illustrates a distributed data grid, in accordance with an embodiment of the invention.

Described herein are systems and methods that can support key management in a distributed computing environment. The system can use a binary radix tree to intern a binary key, wherein the binary key is referred to by a plurality of referrers in the distributed computing environment. Furthermore, the system can provide a reference to a node in the binary radix tree that is associated with the binary key referred to by the plurality of referrers in the distributed computing environment. Then, each said referrer can use the reference to the node in the binary radix tree to realize the binary key without a need for maintaining a copy of the binary key locally. Also described herein is a reference store for memory-efficient storage of sets of references of varying size. The systems and methods for supporting a binary radix tree to intern a binary key and reference store as described herein have particular utility in the distributed data grid described below with respect to FIG. 1. The systems and methods for supporting a binary radix tree to intern a binary key and reference store as described herein may also be applied in wide variety of alternative distributed computing environments and applications.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Distributed Data Grid

A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability and information reliability. As a result of these capabilities, a distributed data grid is well suited for use in computational intensive, stateful middle-tier applications. In particular examples, distributed data grids, such as e.g., the Oracle® Coherence data grid, store information in-memory to achieve higher performance, and employ redundancy in keeping copies of that information synchronized across multiple servers, thus ensuring resiliency of the system and continued availability of the data in the event of failure of a server.

In the following description, an Oracle® Coherence data grid having a partitioned cache is described. However, one of ordinary skill in the art will understand that the present invention, described for example in the summary above, can be applied to any distributed data grid known in the art without departing from the scope of the invention. Moreover, although numerous specific details of an Oracle® Coherence distributed data grid are described to provide a thorough description of the invention, it will be apparent to those skilled in the art that the invention may be practiced in a distributed data grid without these specific details. Thus, a particular implementation of a distributed data grid embodying the present invention can, in some embodiments, exclude certain features, and/or include different, or modified features than those of the distributed data grid described below, without departing from the scope of the invention.

FIG. 1 illustrates and example of a distributed data grid 100 which stores data and provides data access to clients 150. A "data grid cluster", or "distributed data grid", is a system comprising a plurality of computer servers (e.g., 120a, 120b, 120c, and 120d) which work together in one or more cluster (e.g., 100a, 100b, 100c) to store and manage information and related operations, such as computations, within a distributed or clustered environment. While distributed data grid 100 is illustrated as comprising four servers 120a, 120b, 120c, 120d, with five data nodes 130a, 130b, 130c, 130d, and 130e in a cluster 100a, the distributed data grid 100 may comprise any number of clusters and any number of servers and/or nodes in each cluster. The distributed data grid can store the information in-memory to achieve higher performance, and employ redundancy in keeping copies of that information synchronized across multiple servers, thus ensuring resiliency of the system and continued availability of the data in the event of server failure. In an embodiment, the distributed data grid 100 implements the present invention, described for example in the summary above and the detailed description below.

As illustrated in FIG. 1, a distributed data grid provides data storage and management capabilities by distributing data over a number of servers (e.g., 120a, 120b, 120c, and 120d) working together. Each server of the data grid cluster may be a conventional computer system such as, for example, a "commodity x86" server hardware platform with one to two processor sockets and two to four CPU cores per processor socket. Each server (e.g., 120a, 120b, 120c, and 120d) is configured with one or more CPU, Network Interface Card (NIC), and memory including, for example, a minimum of 4 GB of RAM up to 64 GB of RAM or more. Server 120a is illustrated as having CPU 122a, Memory 124a and NIC 126a (these elements are also present but not shown in the other Servers 120b, 120c, 120d). Optionally each server may also be provided with flash memory—e.g. SSD 128a—to provide spillover storage capacity. When provided the SSD capacity is preferably ten times the size of the RAM. The servers (e.g., 120a, 120b, 120c, 120d) in a data grid cluster 100a are connected using high bandwidth NICs (e.g., PCI-X or PCIe) to a high-performance network switch 120 (for example, gigabit Ethernet or better).

A cluster 100a preferably contains a minimum of four physical servers to avoid the possibility of data loss during a failure, but a typical installation has many more servers Failover and failback are more efficient the more servers that are present in each cluster and the impact of a server failure on a cluster is lessened. To minimize communication time between servers, each data grid cluster is ideally confined to a single switch 102 which provides single hop communication between servers. A cluster may thus be limited by the number of ports on the switch 102. A typical cluster will therefore include between 4 and 96 physical servers.

In most Wide Area Network (WAN) configurations of a distributed data grid 100, each data center in the WAN has independent, but interconnected, data grid clusters (e.g., 100a, 100b, and 100c). A WAN may, for example, include many more clusters than shown in FIG. 1. Additionally, by using interconnected but independent clusters (e.g., 100a, 100b, 100c) and/or locating interconnected, but independent, clusters in data centers that are remote from one another, the distributed data grid can secure data and service to clients 150 against simultaneous loss of all servers in one cluster caused by a natural disaster, fire, flooding, extended power loss and the like. Clusters maintained throughout the enterprise and across geographies constitute an automatic 'backup store' and high availability service for enterprise data.

One or more nodes (e.g., 130a, 130b, 130c, 130d and 130e) operate on each server (e.g., 120a, 120b, 120c, 120d) of a cluster 100a. In a distributed data grid the nodes may be for example, software applications, virtual machines, or the like and the servers may comprise an operating system, hypervisor or the like (not shown) on which the node operates. In an Oracle® Coherence data grid, each node is Java virtual machine (JVM). A number of JVM/nodes may be provided on each server depending on the CPU processing power and memory available on the server. JVM/nodes may be added, started, stopped, and deleted as required by the distributed data grid. JVMs that run Oracle® Coherence automatically join and cluster when started. JVM/nodes that join a cluster are called cluster members or cluster nodes.

In an Oracle® Coherence data grid cluster members communicate using Tangosol Cluster Management Protocol (TCMP). TCMP is an IP-based protocol that is used to discover cluster members, manage the cluster, provision services, and transmit data between cluster members. The TCMP protocol provides fully reliable, in-order delivery of all messages. Since the underlying UDP/IP protocol does not provide for either reliable or in-order delivery, TCMP uses a queued, fully asynchronous ACK and NACK-based mechanism for reliable delivery of messages, with unique integral identity for guaranteed ordering of messages in queues associated with the JVMs operating on a server. The TCMP protocol requires only three UDP/IP sockets (one multicast, two unicast) and six threads per JVM/node, regardless of the cluster size.

The functionality of a data grid cluster is based on services provided by cluster nodes. Each service provided by a cluster node has a specific function. Each cluster node can participate in (be a member of) a number of cluster services, both in terms of providing and consuming the cluster services. Some cluster services are provided by all nodes in the cluster whereas other services are provided by only one or only some of the nodes in a cluster. Each service has a service name that uniquely identifies the service within the data grid cluster, and a service type, which defines what the service can do. There may be multiple named instances of each service type provided by nodes in the data grid cluster (other than the root cluster service). All services preferably provide failover and failback without any data loss.

Each service instance provided by a cluster node typically uses one service thread to provide the specific functionality of the service. For example, a distributed cache service provided by a node is provided by single service thread of the node. When the schema definition for the distributed cache is parsed in the JVM/node, a service thread is instantiated with the name specified in the schema. This service thread manages the data in the cache created using the schema definition. Some services optionally support a thread pool of worker threads that can be configured to provide the service thread with additional processing resources. The service thread cooperates with the worker threads in the thread pool to provide the specific functionality of the service.

In an Oracle® Coherence data grid, the cluster service (e.g., 136a, 136b, 136c, 136d, 136e) keeps track of the membership and services in the cluster. Each cluster node always has exactly one service of this type running. The cluster service is automatically started to enable a cluster node to join the cluster. The cluster service is responsible for the detection of other cluster nodes, for detecting the failure (death) of a cluster node, and for registering the availability of other services in the cluster. The proxy service (e.g., 138c) allows connections (e.g. using TCP) from clients that run outside the cluster. The invocation Service (e.g., 134d) allows application code to invoke agents to perform operations on any node in the cluster, or any group of nodes, or across the entire cluster. Although shown on only one node each, the invocation service and proxy service can be configured on any number up to all of the nodes of the distributed data grid.

In an Oracle® Coherence data grid, the distributed cache service (e.g., 132a, 132b, 132c, 132d, 132e) is the service which provides for data storage in the distributed data grid and is operative on all nodes of the cluster that read/write/store cache data, even if the node is storage disabled. The distributed cache service allows cluster nodes to distribute (partition) data across the cluster 100a so that each piece of data in the cache is managed primarily (held) by only one cluster node. The distributed cache service handles storage operation requests such as put, get, etc. The distributed cache service manages distributed caches (e.g., 140a, 140b, 140c, 140d, 140e) defined in a distributed schema definition and partitioned among the nodes of a cluster.

A partition is the basic unit of managed data in the distributed data grid and stored in the distributed caches (e.g., 140a, 140b, 140c, 140d, and 140e). The data is logically divided into primary partitions (e.g., 142a, 142b, 142c, 142d, and 142e), that are distributed across multiple cluster nodes such that exactly one node in the cluster is responsible for each piece of data in the cache. Each cache (e.g., 140a, 140b, 140c, 140d, and 140e) can hold a number of partitions. Each partition (e.g., 142a, 142b, 142c, 142d, 142e) may hold one datum or it may hold many. A partition can be migrated from the cache of one node to the cache of another node when necessary or desirable. For example, when nodes are added to the cluster, the partitions are migrated so that they are distributed among the available nodes including newly added nodes. In a non-replicated distributed data grid there is only one active copy of each partition (the primary partition). However, there is typically also one or more replica/backup copy of each partition (stored on a different server) which is used for failover. Because the data is spread out in partition distributed among the servers of the cluster, the responsibility for managing and providing access to the data is automatically load-balanced across the cluster.

The distributed cache service can be configured so that each piece of data is backed up by one or more other cluster nodes to support failover without any data loss. For example, as shown in FIG. 1, each partition is stored in a primary partition (e.g., dark shaded squares 142a, 142b, 142c, 142d, and 142e) and one or more synchronized backup copy of the partition (e.g., light shaded squares 144a, 144b, 144c, 144d, and 144e). The backup copy of each partition is stored on a separate server/node than the primary partition with which it is synchronized. Failover of a distributed cache service on a node involves promoting the backup copy of the partition to be the primary partition. When a server/node fails, all remaining cluster nodes determine what backup partitions they hold for primary partitions on failed node. The cluster nodes then promote the backup partitions to primary partitions on whatever cluster node they are held (new backup partitions are then created).

A distributed cache is a collection of data objects. Each data object/datum can be, for example, the equivalent of a row of a database table. Each datum is associated with a unique key which identifies the datum. Each partition (e.g., 142a, 142b, 142c, 142d, 142e) may hold one datum or it may hold many and the partitions are distributed among all the nodes of the cluster. In an Oracle® Coherence data grid each key and each datum is stored as a data object serialized in an efficient uncompressed binary encoding called Portable Object Format (POF).

In order to find a particular datum, each node has a map, for example a hash map, which maps keys to partitions. The map is known to all nodes in the cluster and is synchronized and updated across all nodes of the cluster. Each partition has a backing map which maps each key associated with the partition to the corresponding datum stored in the partition. An operation associated with a particular key/datum can be received from a client at any node in the distributed data grid. When the node receives the operation, the node can provide direct access to the value/object associated with the key, if the key is associated with a primary partition on the receiving node. If the key is not associated with a primary partition on the receiving node, the node can direct the operation directly to the node holding the primary partition associated with the key (in one hop). Thus, using the hash map and the partition maps, each node can provide direct or one-hop access to every datum corresponding to every key in the distributed cache.

In some applications, data in the distributed cache is initially populated from a database 110 comprising data 112. The data 112 in database 110 is serialized, partitioned and distributed among the nodes of the distributed data grid. Distributed data grid 100 stores data objects created from data 112 from database 110 in partitions in the memory of servers 120a, 120b, 120c, 120d such that clients 150 and/or applications in data grid 100 can access those data objects directly from memory. Reading from and writing to the data objects in the distributed data grid 100 is much faster and allows more simultaneous connections than could be achieved using the database 110 directly. In-memory replication of data and guaranteed data consistency make the distributed data grid suitable for managing transactions in memory until they are persisted to an external data source such as database 110 for archiving and reporting. If changes are made to the data objects in memory the changes are synchronized between primary and backup partitions and may subsequently be written back to database 110 using asynchronous writes (write behind) to avoid bottlenecks.

Although the data is spread out across cluster nodes, a client 150 can connect to any cluster node and retrieve any datum. This is called location transparency, which means that the developer does not have to code based on the topology of the cache. In some embodiments, a client might connect to a particular service e.g., a proxy service on a particular node. In other embodiments, a connection pool or load balancer may be used to direct a client to a particular node and ensure that client connections are distributed over some or all the data nodes. However connected, a receiving node in the distributed data grid receives tasks from a client 150, and each task is associated with a particular datum, and must therefore be handled by a particular node. Whichever node receives a task (e.g. a call directed to the cache service) for a particular datum identifies the partition in which the datum is stored and the node responsible for that partition, the receiving node, then directs the task to the node holding the requested partition for example by making a remote cache call. Since each piece of data is managed by only one cluster node, an access over the network is only a "single hop" operation. This type of access is extremely scalable, since it can use point-to-point communication and thus take optimal advantage of a switched fabric network such as InfiniBand.

Similarly, a cache update operation can use the same single-hop point-to-point approach with the data being sent both to the node with the primary partition and the node with the backup copy of the partition. Modifications to the cache are not considered complete until all backups have acknowledged receipt, which guarantees that data consistency is maintained, and that no data is lost if a cluster node were to unexpectedly fail during a write operation. The distributed cache service also allows certain cluster nodes to be configured to store data, and others to be configured to not store data.

In some embodiments, a distributed data grid is optionally configured with an elastic data feature which makes use of solid state devices (e.g. SSD 128a), most typically flash drives, to provide spillover capacity for a cache. Using the elastic data feature a cache is specified to use a backing map based on a RAM or DISK journal. Journals provide a mechanism for storing object state changes. Each datum/value is recorded with reference to a specific key and in-memory trees are used to store a pointer to the datum (a tiny datum/value may be stored directly in the tree). This allows some values (data) to be stored in solid state devices (e.g. SSD 128a) while having the index/memory tree stored in memory (e.g. RAM 124a). The elastic data feature allows the distributed data grid to support larger amounts of data per node with little loss in performance compared to completely RAM-based solutions.

A distributed data grid such as the Oracle® Coherence data grid described above can improve system performance by solving data operation latency problems and by caching and processing data in real time. Applications cache data in the data grid, avoiding expensive requests to back-end data sources. The shared data cache provides a single, consistent view of cached data. Reading from the cache is faster than querying back-end data sources and scales naturally with the application tier. In memory performance alleviates bottlenecks and reduces data contention, improving application responsiveness. Parallel query and computation is supported to improve performance for data-based calculations. The distributed data grid is fault-tolerant, providing for data reliability, accuracy, consistency, high availability, and disaster recovery. The distributed data grid enables applications to scale linearly and dynamically for predictable cost and improved resource utilization. For many applications, a distributed data grid offers a valuable shared data source solution.

In embodiments, the distributed data grid 100 implements one or more zero-copy binary radix tree for key management and/or reference store as described, for example, below and illustrated in FIGS. 2-6. In particular embodiments, the zero-copy binary radix tree may be implemented for key management with respect to a backing map based on a RAM or DISK journal. In an embodiment the backing map based on a RAM or DISK journal is utilized in conjunction with an elastic data feature of the distributed data grid which utilizes solid state devices (e.g. SSD 128a), most typically flash drives, to provide spillover capacity for a cache. By utilizing a zero-copy binary radix tree the distributed data grid reduces or eliminates the memory wastage associated with maintaining multiple copies of keys in the RAM of the servers thereby improving performance of the distributed data grid. Furthermore, the distributed data grid 100 can implement a reference store for storing references to keys interned in the zero-copy binary radix tree in a memory efficient manner.

Key Management in a Distributed Data Grid

Described herein are systems and methods that can support key management using a zero-copy binary radix tree in a distributed computing environment including, for example, the distributed data grid of FIG. 1. Also described herein is a reference store for storing references to keys interned in the zero-copy binary radix tree in a memory efficient manner.

A binary radix tree is a type of trie. A trie, is an ordered data structure that is used to store a dynamic set or associative array where the keys are usually strings. Unlike a binary search tree, no node in the trie stores the entire key associated with that node; instead, the position of the node in the tree defines the key with which it is associated. All the descendants of a node have a common prefix of the string associated with that node, and the root of the trie is associated with the empty string. A trie can be used to retrieve values associated with keys. Values are not necessarily associated with every node. Some nodes internal to the trie merely reference additional nodes. Rather, values tend only to be associated with leaves, and with some inner nodes that correspond to keys of interest.

A radix tree is a data structure that represents a space-optimized trie in which each node that is the only child of a parent node is merged with its parent node. Advantageously, unlike regular trees the binary radix tree does not require comparison of whole keys en masse from their beginning up to the point of inequality. In a binary radix trie, comparing a node's portion of the key is used to select one of the child nodes when traversing the trie (for example left child node where next bit=1, right child node where next bit=0). All child nodes of a particular internal node share the same prefix up to the point of inequality i.e. where they split at the particular internal node. A binary radix tree provides a space efficient way to store a binary key set and also enables efficient mechanisms for traversing the tree to retrieve the value associated with a given binary key.

Figure 2:
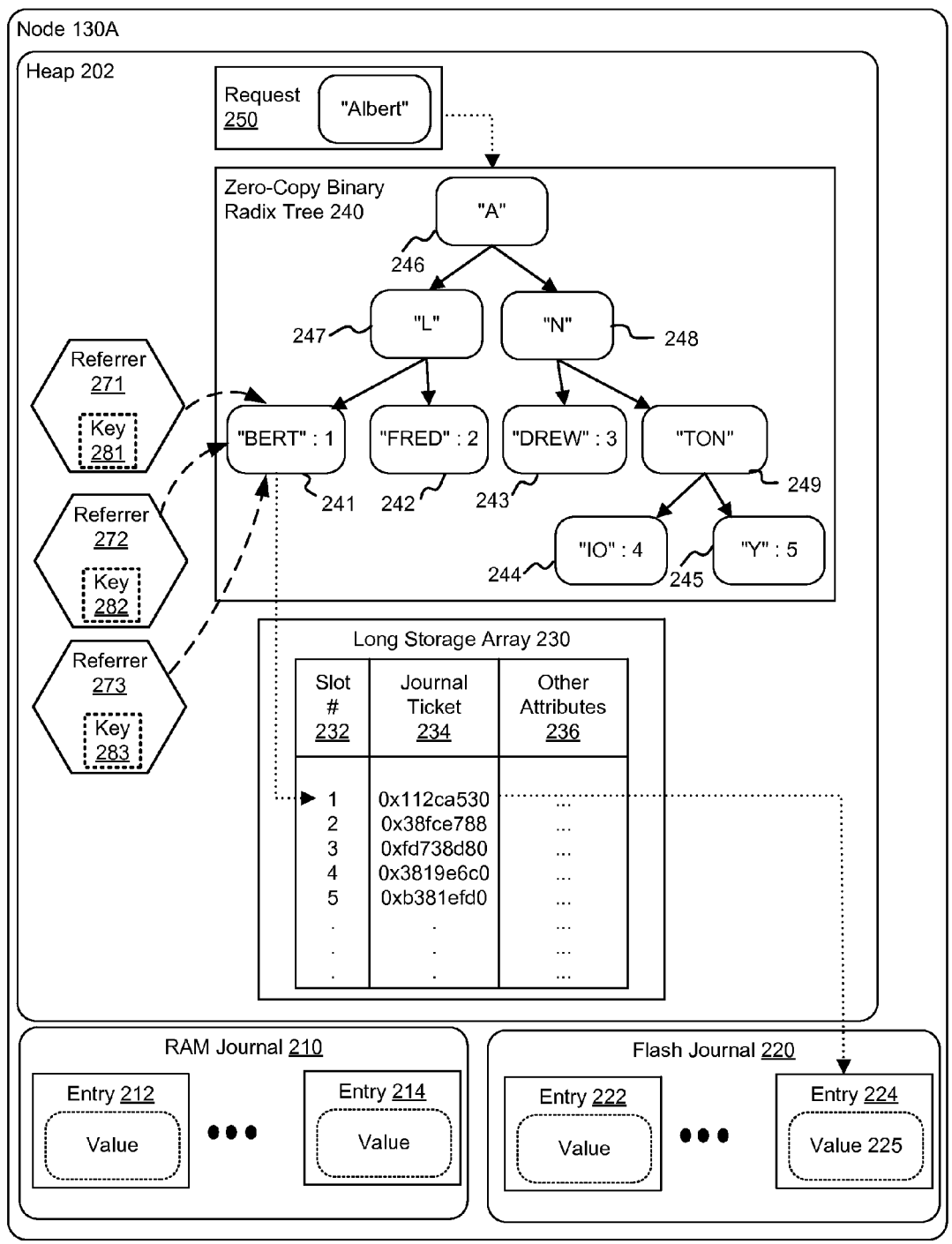
FIG. 2 illustrates use of a zero-copy binary radix tree in a distributed computing environment, in accordance with an embodiment of the invention.

FIG. 2 shows an illustration of supporting an elastic data structure in a distributed data grid, using a zero-copy binary radix tree. As shown in FIG. 1, a node 130a can include both random access memory (RAM 124a) and various disk-based devices such as solid state disks (SSD 128a). A node 130a of data grid cluster 100 can take advantage of an elastic data structure, which enables the data grid cluster to store data in SSD 128a and/or read data from SSD 128a at a near memory speed (See FIG. 1). As shown in FIG. 2, node 130a uses a RAM journal 210 for storing data in-memory and uses a flash journal 220 for storing data to the flash-based devices. The journals 210, 220 record state changes associated with a sequence of modifications of values/objects in data storage. Additionally, the RAM journal 210 works with the flash journal 220 to enable seamless data overflow from the RAM storage to the flash disk storage. The RAM journal 210 and the flash journal 220 can be used in different manners. For example, the RAM journal 210 and the flash journal 220 can be used for supporting backing maps, supporting backup storage, and/or supporting composite caches (e.g. a near cache) in the node 130a.

Each of the journals 210-220 used by the node 130a can contain multiple entries. For example, the RAM journal 210 can include RAM journal entries 212-214, while the flash journal 220 can include flash journal entries 222-224. The system associates each value/object stored in each different journal entries 212, 214, 222, 224 with a unique key. As changes are applied to the elastic data storage, each key remains associated with the journal entry that contains the current version of the value/object. Thus, a user can find a value stored in a journal entry in the elastic data structure 200, using the associated key stored on the heap 202.

In order to find the values, each journal entry is associated with a journal ticket which is stored separately on heap 202. The journal ticket identifies the location of the entry in either the RAM journal 210 or flash journal 220. The journal ticket can represent a virtual address for a value that is stored off-heap, such as in an entry of a journal that corresponds to the key. Additionally, the journal ticket can include additional attributes that are associated with the value stored off-heap (such as an eviction attribute and an expiry attribute). The journal ticket uses the long primitive data type. In Java, the long data type is a 64-bit signed two's complement integer. A long storage array 230 can be provided for storing the journal tickets associated with each of entries. As shown in FIG. 2, long storage array 230 comprises a plurality of numbered slots/rows 232 each containing one of a plurality of journal tickets 234 and optionally also including a plurality of attributes 236 associated with the journal entries 234. The long storage array 230 allows the journal ticket in a slot/row to be retrieved using the slot number. The journal ticket allows a corresponding entry to be retrieved from whichever journal (RAM or Flash) it is located in.

However, a requestor needs to find the entry associated with a particular key. A simple way to achieve this would be to add a column to long storage array 230 which includes the key associated with each entry. However, this solution is undesirable because it requires a copy of every key to be included in the long storage array and because searching for a matching key would be an expensive operation. Instead, as shown in FIG. 2, a zero-copy binary radix tree 240 is provided for storing the keys associated with journal entries in a compressed manner and allowing for efficient retrieval of a journal ticket corresponding to a journal entry corresponding to a key. The zero-copy binary radix tree 240 associates binary keys with the slots 232 of the long storage array 230 such that a binary key can be used to find the associated value in the journals 210, 220.

As shown in FIG. 2, the server node 130a uses a zero-copy binary radix tree 240 for storing different keys 241-245 on heap 202 of node 130a. For example, the keys 241-245 stored in the zero-copy binary radix tree 240 include "ALBERT" 241, "ALFRED" 242, "ANDREW" 243, "ANTONIO" 244 and "ANTONY" 245. As shown in FIG. 2, the root node 246 for the zero-copy binary radix tree 240 stores a character "A", since all keys 241-245 stored in the zero-copy binary radix tree 240 start with a character "A." Furthermore, both the two keys, "ALBERT" 331 and "ALFRED" 332, which begin with the characters "AL," share the same internal node 247. Additionally, the key "ALBERT" 331 uses the node 241, which contains the characters "BERT" and the key "ALFRED" uses the node 242, which contains the characters "FRED". Similarly, the key "ANDREW" 333 uses the nodes 246, 248, and 243, while the key "ANTONIO" uses the nodes 246, 248, 249, and 244, and the key "ANTONY" uses the nodes 246, 248, 249, and 245. Note that while alphabetic keys have been shown for ease of explanation, the radix tree will typically be a binary radix tree, the keys will typically be binaries, and the nodes will represent particular bits or chunks of bits in the binaries.

Each node 241-245 representing a compressed key stored in the zero-copy binary radix tree 240 also is associated with one of the numbered slots 232 in long storage array 230 thereby associating each particular compressed key with a particular slot 232 in the array containing a particular journal ticket 234 and associated with a particular value/object in the flash journal 220 or Ram Journal 210. The zero-copy binary radix tree 240 thus acts as a binary long map which associates binary keys with journal tickets (in long format) which identify the journal entry containing the value/object associated with the key. Additionally, in order to improve efficiency, tiny values (e.g. values with a size up to seven bytes) can be stored directly in the zero-copy binary radix tree 240, instead being stored off-heap in the Journals 210, 220.

As shown in FIG. 2, the node 241, which is used to store the key "ALBERT" includes a reference to slot 1 of long storage array 230 which stores journal ticket, "0x112ca530". The node 242, which is used to store the key "ALFRED" includes a reference to slot 2 of long storage array 230 which stores journal ticket, "0x38fce788". The node 243, which is used to store the key "ANDREW" includes a reference to slot 3 of long storage array 230 which stores a journal ticket, "0xfd738d80". The node 244, which is used to store the key "ANTONIO" includes a reference to slot 4 of long storage array 230 which stores a journal ticket, "0x3819e6c0". Finally, the node 245, which is used to store the key "ANTONY" includes a reference to slot 5 of long storage array 230 which stores a journal ticket, "0xb381 efd0".

Thus, as shown in FIG. 2, when a request is obtained for the value associated with the key "ALBERT". The key "ALBERT" is applied to the Radix tree 240 which identifies node 241 as corresponding to the key "ALBERT". Node 241 contains a reference to slot 1 of long storage array 230, thus the Journal ticket "0x112ca530" is used from slot 1 of long storage array 230. The journal ticket "0x112ca530" ticket represents a virtual address for the value 225 corresponding to the key "ALBERT" that is stored off-heap in an entry 224 of a journal. Thus, the system enables retrieval of the value 225 from the journal in response to a request containing the key "ALBERT" associated with the value. Additionally, by utilizing such a compact data structure, the system can store metadata information for very large datasets.

Use of a binary radix tree in a distributed data grid is further described, for example, in U.S. patent application Ser. No. 14/322,576 entitled "SYSTEM AND METHOD FOR SUPPORTING ELASTIC DATA METADATA COMPRESSION IN A DISTRIBUTED DATA GRID" filed Jul. 2, 2014, U.S. patent application Ser. No. 14/298,458 entitled "SYSTEM AND METHOD FOR SUPPORTING MEMORY ALLOCATION CONTROL WITH PUSH-BACK IN A DISTRIBUTED DATA GRID" filed Jul. 2, 2014, and U.S. Pat. No. 8,621,143 entitled "ELASTIC DATA TECHNIQUES FOR MANAGING CACHE STORAGE USING RAM AND FLASH-BASED MEMORY" issued Dec. 31, 2013 both of which application and patent are incorporated herein by reference. As described therein, the keys 202, 203, 204 of the data are compressed into the efficient binary radix tree data structure which acts as an index for to values/objects stored in memory blocks in RAM and flash disk.

In the distributed data grid of FIG. 1, many data structures pivot on a key. The zero-copy binary radix tree 240 shown in FIG. 2 thus provides a means for performing an operation on a value/object associated with a key (either directly from the tree or using a journal ticket). Binary radix trees are space efficient, inter alia, because the nodes in the tree do not store entire keys, but only the chunk of a key needed to select a child node. However, a distributed data grid may also be configured to provide a number of indices and reverse indices that enable and/or facilitate finding objects based on parameters of the value/object. For example an Oracle® Coherence data grid indexes data for efficient query performance. To allow a query to be performed expediently inverse indices are created (IndexedValue->Set<Key>) that allow a query to identify keys matching a query value. Where there are large numbers of indexed values, this results in the need to maintain a large number of sets of keys Set<Key>.

In prior systems, the reference to the value/object required each referrer to maintain a copy of the entire binary key (e.g. "ANTONY") for each member of the set. Thus each referrer had to maintain a byte copy of the key corresponding to a value in order to retrieve the value using the binary radix tree. For example an index/referrer would have to include a byte copy of the key for each value/object in the set. That is a reverse index was literally a set of byte copies of keys for objects satisfying the indexed value. Moreover, where multiple referrers refer to the same key, each of the referrers has to maintain a copy of the entire binary key resulting in multiple copies of each entire binary key. Because these referrers/indices are stored on-heap, maintaining multiple copies of many binary keys imposes a significant memory cost associated with key management in the distributed data grid.

Zero-Copy Feature

Thus, it is desirable to reduce the memory cost imposed by maintaining multiple copies of many entire binary keys in referrers (such as e.g. indices) in the distributed data grid in order to improve performance of the distributed data grid or another distributed computing environment. Accordingly, the present disclosure describes systems and methods for supporting a zero-copy binary radix tree which reduces or eliminates the memory cost imposed by maintaining multiple copies of many binary keys in the distributed data grid. In accordance with embodiments of the invention, a referrer maintains a reference to a node in the zero-copy binary radix tree by position of the node in the zero-copy binary radix tree 240 instead of maintaining a byte copy of the entire binary key. A reference to the position of a node in the zero-copy binary radix tree requires much less memory than a copy of the entire binary key thereby reducing or eliminating the memory cost imposed by maintaining multiple copies of many binary keys and improving performance of the distributed data grid or another distributed computing environment.

FIG. 2 illustrates supporting a zero-copy feature in a binary radix tree in a distributed computing environment, in accordance with an embodiment of the invention. As shown in FIG. 2, multiple referrers 271-273 in the distributed computing environment can refer to the same key stored in the zero-copy binary radix tree 240 without a need for maintaining a copy of the key locally (i.e. a zero-copy type of feature). For example, the referrers 271-273 can all refer to the same key "ALBERT" via the leaf node 241. Furthermore, the zero-copy binary radix tree 240 is tolerant of concurrent modifications and can be immutable. Thus, the zero-copy binary radix tree 240 provides a highly efficient mechanism to access the bytes in an appropriate binary key and allows for safe external references to the nodes of the zero-copy binary radix tree 240.

Without the zero-copy feature, each referrer would need to maintain a copy of the key that the referrer refers to. For example, each of the different referrers 271-273 would need to store a separate copy 281-283 of the key "ALBERT" on heap 202 (i.e. one copy per referrer), in order to maintain an external reference to the binary key "ALBERT" stored in the zero-copy binary radix tree 240. Using the zero-copy feature, it is unnecessary for each of the different referrers 271-273 to store a separate copy 281-283 of the key "ALBERT". Thus, the zero-copy feature can significantly reduce the on-heap memory cost associated with the key management in the distributed computing environment 200.

As shown in FIG. 2, a facility is provided to intern the binary keys into the binary radix tree 210. The binary radix tree 210 provides a data structure that is highly compact allowing shared bytes to be de-duplicated. The binary radix tree is initiated when the cache is initiated to store keys associated with the cache. Referring to a byte array typically requires a copy of these bytes. However, binaries in the zero-copy binary radix tree 210 are made usable by serializing the key directly to a byte buffer (destination: network, disk), creating a "view" of the binary. The "view" of the binary exposes a navigable byte array to the consumer, and navigating the binary stored in the zero-copy binary radix tree. The bytes in the "view" of the binary can be accessed by referrers without copying the underlying bytes. Thus the zero-copy binary radix tree system allows a zero-copy reference thus achieving both density and the ability to reference those bytes.

All referrers 211-213 can then reference a position in a ReadBuffer which is a node in the zero-copy binary radix tree 240 (e.g. node 241 of FIG. 2). A reference is essentially an interface that exposes a navigable byte array. The interface, called a ByteSequence offers methods such as byteAt (n) and length( ) thus can be used within a for loop construct to effectively refer to keys in the byte array. The ByteSequence interface represents a sequence of bytes in the navigable byte array. The method byteAt(n) determines the n-th byte of the byte sequence. The method length can determine the number of bytes of data represented in a node of the byte sequence. Thus, a referrer such as an inverse index can be implemented as a Set<ByteSequence> which provides a 'view'/ByteSequence into the binary radix tree that allows access to the bytes. This is advantageous compared to implementation of an inverse index referrer as a Set<Binary> which requires each binary in the set to be fully realized with a copy of all the bytes in the binary radix tree. Thus the zero-copy binary radix tree system allows a zero-copy reference (i.e. no copies of the binary radix tree) thus achieving both density and the ability to reference the bytes of the binary radix tree. The position in the zero-copy binary radix tree 240 represents the referenced key. This results in zero-copies of the key and thus less memory wastage. That is referrers 211-213 are not required to maintain copies 281, 282, and 283 of key "ALBERT".

The zero-copy binary radix tree is a fluid data structure in that keys can be added or deleted concurrent with key retrieval. As keys are added, new leaf nodes are added and old leaf nodes are split. The zero-copy binary radix tree accounts for tree modifications that result in splitting the tree and orphaned references by, for example, a reference collection process, in which a reference collector thread collects and corrects orphaned references to the zero-copy binary radix tree 240. Referrers are signaled to modify obsolete references. A reference (ByteSequence) can itself be self-updating. This means that the 'view'/ByteSequence into the BRT is signaled to understand that it is no longer valid and a valid reference should be derived. The valid reference will replace the invalid reference. The resolving of orphaned nodes is a task submitted to the daemon pool of the service, therefore a dedicated thread is not required. The collector thread is aware/informed of all the nodes that have been orphaned and the set of inverse indices can be checked based on identity to derive orphaned nodes.

Additionally, where a node is orphaned, it still maintains a one-way reference to its parent node such that it can serve as an entry point to the tree. The orphaned node is functionally correct. The orphaned node can be determined to be an orphaned node by examining its parent's reference. If the indicated parent no longer references the nodes then the node is an orphaned node. A node becomes orphaned due to a split in the tree therefore the parent will still refer to some of the bytes in the orphaned node. Accordingly, the new/valid node can be determined starting from the parent node and walking down the tree to the new/valid node.

While the orphaned node is functionally correct and can be used to find the new/valid node it is still important to dereference the orphaned nodes. This is because the orphaned node is duplicative of the node that replaced it after e.g. the split. The orphaned node cannot not be garbage collected, until it is dereferenced and thus the presence of orphaned nodes reduces the effective memory density of the binary radix tree. Accordingly, signaling, collection, and de-referencing is performed to allow the orphaned nodes to be garbage collected which increases the effective memory density of the binary radix tree and decreases overall memory usage.

FIG. 3A illustrates an embodiment of a zero-copy binary radix tree 300 comprising a root node 302 and a plurality of leaf nodes (306a-306l) (a limited a number of nodes are shown for illustrative purposes however a much larger set of nodes would be present). Although references to the binary radix tree are made through an interface which enables the zero-copy features, the binary radix tree itself is implemented in a substantially conventional manner. As shown in FIG. 3A, each node can have a plurality of child nodes where each child is in an array that can be binary searched to find the right node given the first byte (up to 255 child nodes as each child node represents a unique byte). The binary radix tree comprises compact nodes and byte array nodes. A compact node is one that can store all of its information in eight bytes (long). Where the information is larger than can held in eight bytes long a byte array node is used. A leaf node represents the tail of a byte array stored in the binary radix tree. For example, storing 0xFFF1, 0xFFF2 and 0xFFF1FF in the binary radix tree would result in the bolded portions being leaf nodes. Also, F1 will be both a leaf node and a parent node of the third key 0xFFF1FF. A nodes position in the binary radix tree is based on the shared bytes in the byte arrays stored in addition to the number of keys stored.

However, as the binary radix tree increases in depth, the number of linked nodes which must be traversed to realize a single key increases, and thus the cost of walking the binary radix tree to realize a key also increases. An efficient walk mechanism is provided to answer questions such as byteAt(n) which returns the byte at the n'th position in the tree. The efficient walk mechanism reduces the number of nodes which must be traversed to determine the byte at the n'th position in the tree. Unlike a conventional binary radix tress, the binary radix tree of the disclosed herein is enhanced with "Satellite" nodes which shorten the maximum distance the binary radix tree must be walked to answer questions such as byteAt(n). The "Satellite" nodes 304 encode information that identifies their position in the tree and thus they facilitate answering questions such as such as byteAt(n) for the entire binary key without walking the entire tree. Thus retrieving a value using the zero-copy binary radix tree 240 is highly efficient for interned keys.

Satellite nodes 304 are 'special' nodes in that they are aware of their position relative to the root node. The satellite node position information is stored either in the long (compact nodes) or the byte array such that it can be used during traversal of the binary radix tree. The position of the satellite nodes in the binary radix can be determined by an adaptive algorithm based on the usage model. The adaptive algorithm trades off the additional memory required to store position information versus reduction in tree traversal overhead. For example, satellite nodes may be adaptively placed closer to nodes that are frequently walked in order to reduce the number of nodes that must be traversed for keys that are accessed frequently. Alternatively satellite nodes are provided at ⅛ of the distance from the leaf nodes to the root node of the binary radix tree. The satellite nodes "know" how far they are from the root node 302, thus, when walking the tree to answer byteAt(n) the traversal need only go up as far as the satellite node before traversing towards the correct leaf node. For example, consider 100 bytes stored in the BRT and the function byteAt(91) is invoked; to determine the byte at position 91, it is necessary to walk to the top of the tree to find the 0 position and walk down to position 91. However a satellite node 304 at byte 50 would allow allows the walk to limit the navigation to 50 bytes up and 41 down opposed to 100 up and 91 down.

Other than the presence of satellite nodes, a primary difference between the zero-copy binary radix tree and conventional binary radix tree is how a key is returned from the binary radix tree. In prior implementations when a referrer requested a key from the binary radix tree, a byte array copy of the key was returned. In comparison, in the zero-copy binary radix tree disclosed herein, the zero-copy binary radix tree returns instead a reference to a position of a node in the byte array. Thus, for example inverse index 330 contains a set of references to positions in byte array 310 (e.g. 336*a*, 336*d*, 336*i*, 336*j*) instead of copies of the binary key. This reduces memory overhead for indices.

As described above binaries in the zero-copy binary radix tree 210 are made usable by serializing the key directly to a byte array 310, creating a "view" of the binary. The "view" of the binary exposes a navigable byte array 310 of the leaf nodes 306*a*-306*l* to the consumer. The leaf nodes 306*a*-306*l* are themselves exposed as implementers of an interface 320 named ByteSequence. This ByteSequence interface 320 allows the byte array 310 stored in the binary radix tree 300 to be referenced without copying the bytes in the binary radix tree realizing a byte array. The nodes in the binary radix tree are never directly exposed outside of the binary radix tree, instead the ByteSequence interface 320 allows the byte array to be navigated using references to nodes at particular positions in the byte array and traversal of the byte array.

The bytes in the "view" of the binary can thus be accessed by referrers, for example inverse index 330, without copying the underlying bytes. Thus reference to a leaf node allows the consumer to navigate the binary without the need to create a copy of a binary key. Moreover the use of references enables providing functions such as optimized hashCodes and equals implementations and thus efficient use in hash-based containers such as inverse key indices. See, for example, the reference store implementation described below. Each index requires referencing at least all the keys at least twice (forward index and inverse index). Thus using references instead of creating byte copies of keys significantly reduces the memory overhead for indices in addition to facilitating streaming the navigable binary directly to a stream such as a DataOutput that sends bytes over a socket.

Figure 3B:
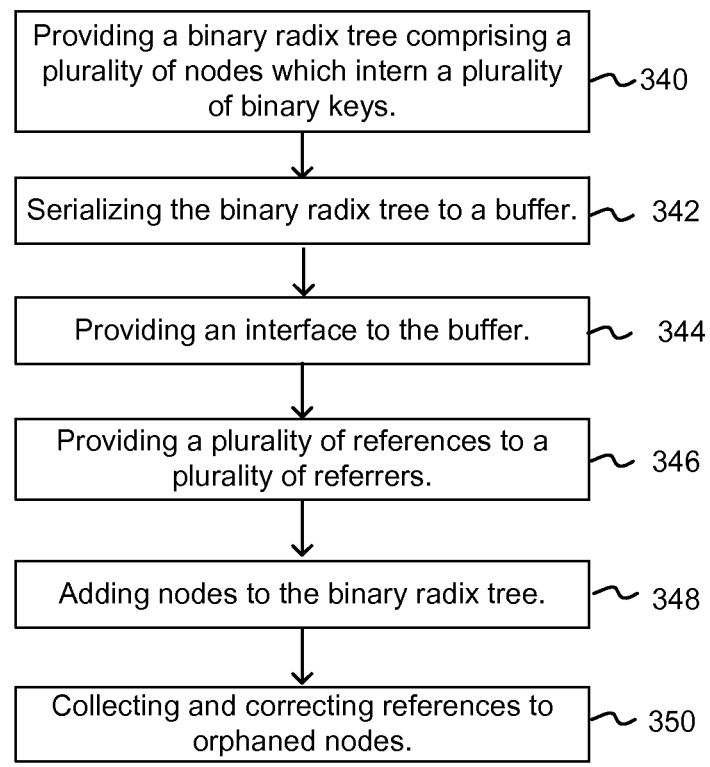
FIG. 3B illustrates a zero-copy binary radix tree method in a distributed computing environment, in accordance with an embodiment of the invention.

FIG. 3B illustrates a zero-copy binary radix tree method in a distributed computing environment, in accordance with an embodiment of the invention. As shown in FIG. 3B, the method comprises providing a binary radix tree at step 340. The binary radix tree comprises a plurality of nodes which intern a plurality of binary keys. At step 342 the binary radix tree is serializing to a buffer to provide a view of the binary. At step 344, an interface is provided to the buffer. The interface, for example, is a byte sequence buffer which supports methods such as byteAt(n) and length. At step 346, a plurality of references to nodes in the buffer is provided to a plurality of referrers. The referrer may comprise a plurality of reverse indices. The references allow the referrers to realize the binary keys and locate values associated with the keys without maintaining copies of the keys. Use of references in place of byte copies of binary keys reduces the memory overhead associated with reverse indices. At step 348, nodes may be added to the binary radix tree. At step 350, a collector thread collects and corrects references to orphaned nodes.

In some embodiments referrers, such as reverse indices, may utilize a reference store as described below to store references to nodes in the buffer.

Reference Store

The use of indices in a distributed computing environment, such as the distributed data grid 100 of FIG. 1, may require a large number of references to be held (e.g. for mapping indexed value to a store of key references in order to allow queries to be performed efficiently). For example, for efficient query performance an Oracle® Coherence data grid indexes data by creating inverse indices which identify a set of keys to objects corresponding to the indexed value (IndexedValue→Set<Key>). There may be a large number of indexed values and this results in the need to maintain a large number of Set<Keys>. Moreover some of these sets will be large (e.g. for common values) and some of these sets will be small (e.g. for rare values). Given the large number of Set<Keys> that may need to be maintained it is desirable that they be stored in a memory efficient fashion. However prior systems utilized conventional JDK implmentations of Set<Key>. This conventional Set implementation is not optimized for storing either small or large numbers of elements and thus is not memory efficient. It is thus desirable to provide a system and method which maps indexed values to a store of key references in a memory efficient manner optimized for storing both small and large numbers of elements.

In accordance with an embodiment of the invention, a reference store can be used in a distributed computing environment for storing references in a key value store in a memory efficient fashion. The use of the reference store allows the set of references to be stored efficiently. Furthermore, the size of the reference store used for a particular set of references can be inflated or deflated as the data set changes to accommodate for the change in memory requirements. The inflation or deflation of a reference store is triggered by removing or adding references to the store. The API returns a handle/ticket to a store as the result of any insert or removal of the store. This returned handle could be the same as the original store or different in the case of inflation or deflation.

Figure 4:
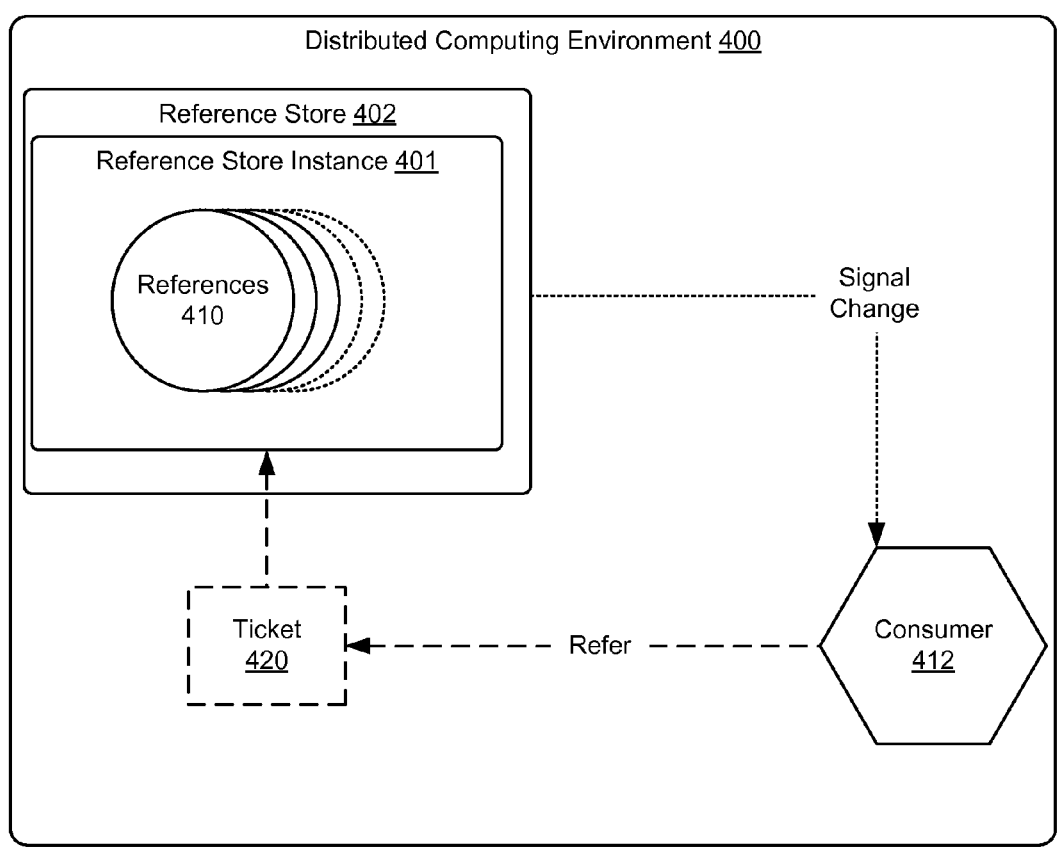
FIG. 4 illustrates a reference store in a distributed computing environment, in accordance with an embodiment of the invention.

FIG. 4 shows an illustration of supporting a reference store 402 in a distributed computing environment, in accordance with an embodiment of the invention. As shown in FIG. 4, a reference store instance 401 in a distributed computing environment 400, e.g. a distributed data grid, can contain a plurality of references 410 (e.g. various keys associated with an inverse index or references to a navigable byte array provided by the zero-copy binary radix tree implementation described above).

As shown in FIG. 4, reference store 402 includes a plurality of reference store instances 401. Each reference store instance 401 can be optimized for storing a small number of references and also can be adaptively optimized for storing a large number of references. Furthermore, each reference store instance 401 is associated with a ticket 420 (e.g. a Long variable). The system uses the ticket 420 to expose the reference store instance 401 to one or more consumers 412 in the distributed computing environment 400. A consumer is any actor that needs to be made aware of a change to the reference store instance. For example, if an inverse index refers to a reference store instance (a collection of keys); the index can itself be a consumer that is signaled once the reference store instance changes and can look up the new reference store instance. Additionally, the reference store 402 signals said one or more consumers 412 with regard to any change that has occurred to the reference store instance 401, e.g. the inflation or deflation of the reference store instance 401.

Each reference store instance can inflate (or deflate) from a store optimized for storing a small number of references to a store optimized for storing a small number of references large number. Moreover, reference store instances are managed such that they can be reused after inflation/deflation events avoiding reallocation of memory required for the reference store. This provides highly efficient memory usage and access times for references. Consumers (those who refer to reference stores) can register to be signaled when changes occur to the store. The registered consumers can then consume signals from the reference store, i.e. regarding inflation/deflation events. The reference store becomes more beneficial as the number of inverse indices increase and the number of keys per indexed value increase.

Thus, a reference store is created and referred to with a ticket. The ticket is expressed with the long primitive data type. In Java, the long data type is a 64-bit signed two's complement integer. Exposing the reference store instance as a long allows referrers to use compact efficient data structures to refer to the store, i.e. LongLongMap. In Java, LongLongMap provides an associative container with unique binding from keys to a single value. In this application LongLongMap associates a key representing the reference store to the contents of the reference store. The ticket associated with a particular index may change when the reference store instance for a particular index is inflated or deflated. Thus, when the reference store instance for a particular index is inflated or deflated a new ticket is assigned to the index in the reference store.

Figure 5:
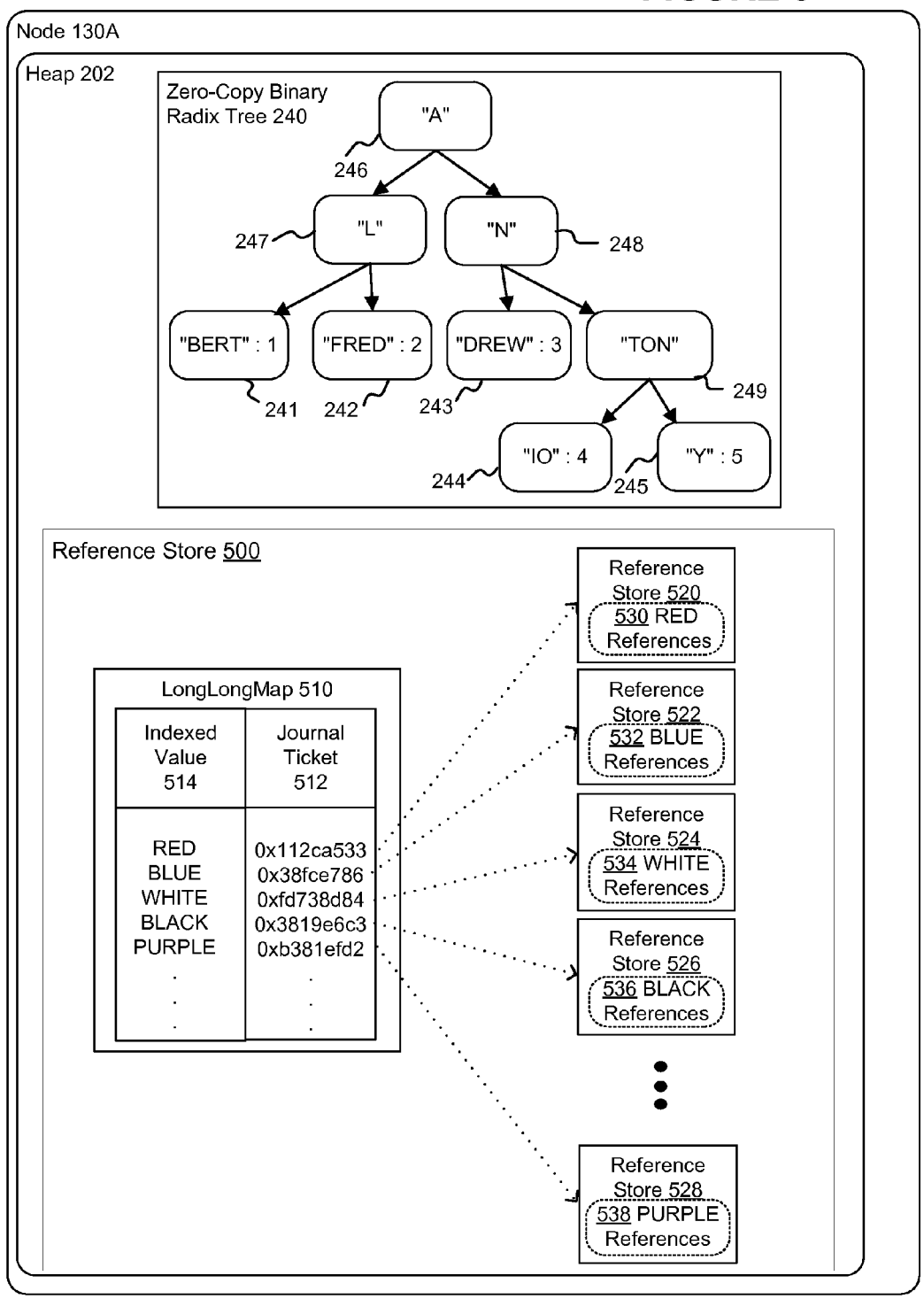
FIG. 5 illustrates a reference store in a distributed computing environment, in accordance with an embodiment of the invention.

FIG. 5 shows a reference store 500 which uses a LongLongMap 510 in conjunction with a plurality of reference store instances 520-528. Reference store instance 520 stores a set of references 530 into zero-copy binary radix tree for nodes that correspond to keys that correspond to objects satisfying the indexed value "RED". Reference store instance 522 stores a set of references 532 into zero-copy binary radix tree for nodes that correspond to keys that correspond to objects satisfying the indexed value "BLUE". Reference store instance 524 stores a set of references 534 into zero-copy binary radix tree for nodes that correspond to keys that correspond to objects satisfying the indexed value "WHITE". Reference store instance 526 stores a set of references 536 into zero-copy binary radix tree for nodes that correspond to keys that correspond to objects satisfying the indexed value "BLACK". Reference store instance 528 stores a set of references 538 into zero-copy binary radix tree for nodes that correspond to keys that correspond to objects satisfying the indexed value "PURPLE".

LongLongMap 510 comprises a plurality of rows which associate a plurality of indexed values 514 with a plurality of tickets 512. The tickets represent a virtual address for the reference store associated with the indexed values. Thus LongLongMap 510 associated the indexed values "RED" with ticket "0x112ca533", "BLUE" with ticket "0x38fce786", "WHITE" with ticket "0xfd738d84", "BLACK" with ticket "0x3819e6c3", and "PURPLE" with ticket "0xb381efd2". Thus, in response to a query for all the "RED" objects, LongLongMap can identify reference store 520 using ticket "0x112ca533" and thus return the set 530 of references. The set 530 of references identify nodes in zero-copy binary radix tree 240 corresponding to keys for values/objects that satisfy the indexed value "RED". Thus, the system can return all the values/objects satisfying the indexed value "RED" in response to the query. The ticket associated with a particular index may change when the reference store instance for a particular index is inflated or deflated. Thus, when the reference store instance for a particular index is inflated or deflated a new ticket is assigned to the index in the LongLongMap 510.

Moreover, the number of references in each of the reference store instances may vary considerably depending upon the prevalence of values/objects satisfying the particular indexed value. For example, "PURPLE" objects may be considerably less prevalent than "BLACK" objects. In order to optimize memory usage by the reference store instances, the reference store instances may utilize different data structures depending on the number of references stored. This is different than prior implementations of set<key> for example which associated indexed values to keys using a hash set no matter the number of keys in the set. This implementation was expensive both in terms of memory usage and access cost. In particular, where the number of references is small the use of a hash set has higher memory and access overhead than required.

Thus, the reference store 500 provides a more efficient mechanism in terms of memory usage and access efficiency for storing groups of references of different sizes. The reference store 500 implements a contract with the index that needs to store the references corresponding to an indexed value based on the number of references in the store. For example, where there are 64 or less references, the reference store 500 utilizes a bit-mask based reference store instance to store the references. Each time a reference is provided to store, it is placed in a different one of the 64 slots in the bit-mask-based reference store instance. When all slots are full, if another reference is received to store, the reference store instance is inflated.

To inflate the reference store instance, a new ticket is associated with the index where the new ticket refers to new reference store which can be list-based or hash-based depending on the number of references. The new reference store instance may be created at this time or may already have been allocated and be currently unused. The references in the prior bit-mask based reference store are migrated over to the new reference store. The reference store retains the memory allocation for the now-unused bit-mask-based reference store so that it can be assigned to another index if needed.

The list-based reference store instance is memory efficient and can hold an unlimited number of references. However, the simple list-based reference store lacks hashing semantics and thus the cast of accessing the references in the store increases as the number of references increase. Thus, the reference store utilizes the list-based references store instance to store references for a particular index until a threshold number of references is reached where the access cost is too high to continue using the list-based references store instance. At this point, if further references are added to the reference store instance, the reference store instance is again inflated.

To inflate the list-based reference store instance, a new ticket is associated with the index where the new ticket refers to a hash-based reference store instance. The hash-based reference store instance may be created at this time or may already have been allocated and be currently unused.

The references in the prior list-based reference store are migrated over to the new hash-based reference store. The reference store retains the memory allocation for the now-unused list-based reference store so that it can be assigned to another index if needed. The hash-based reference store instance requires more memory than the list-based reference store instance but the hashing semantics reduce the cost of accessing the references in the store when there are large numbers of references. The has-based reference store is implemented as an open hash set and is the largest reference-store implementation.

The reference store 500 can also deflate the reference store instances where the number of references in the reference store is reduced such that the references can be stored in one of the smaller reference store instances. Thus a hash-based reference store instance can be deflated to a list based-reference store instance by providing the ticket for the list-based reference store and migrating the references. Also, a list-based reference store instance can be deflated to a bit-mask-based reference store instance by providing the ticket for the bit-mask-based reference store and migrating the references. In all cases, after migration, the unused data structure can be maintained until it is needed for a different index thereby reducing the need to create new reference stores and request new memory allocations for the node/JVM. In an embodiment, the reference store can pre-allocate memory for reference store instances of each type based on an understanding of the typical requirements for reference store instances of each type.

Figure 6:
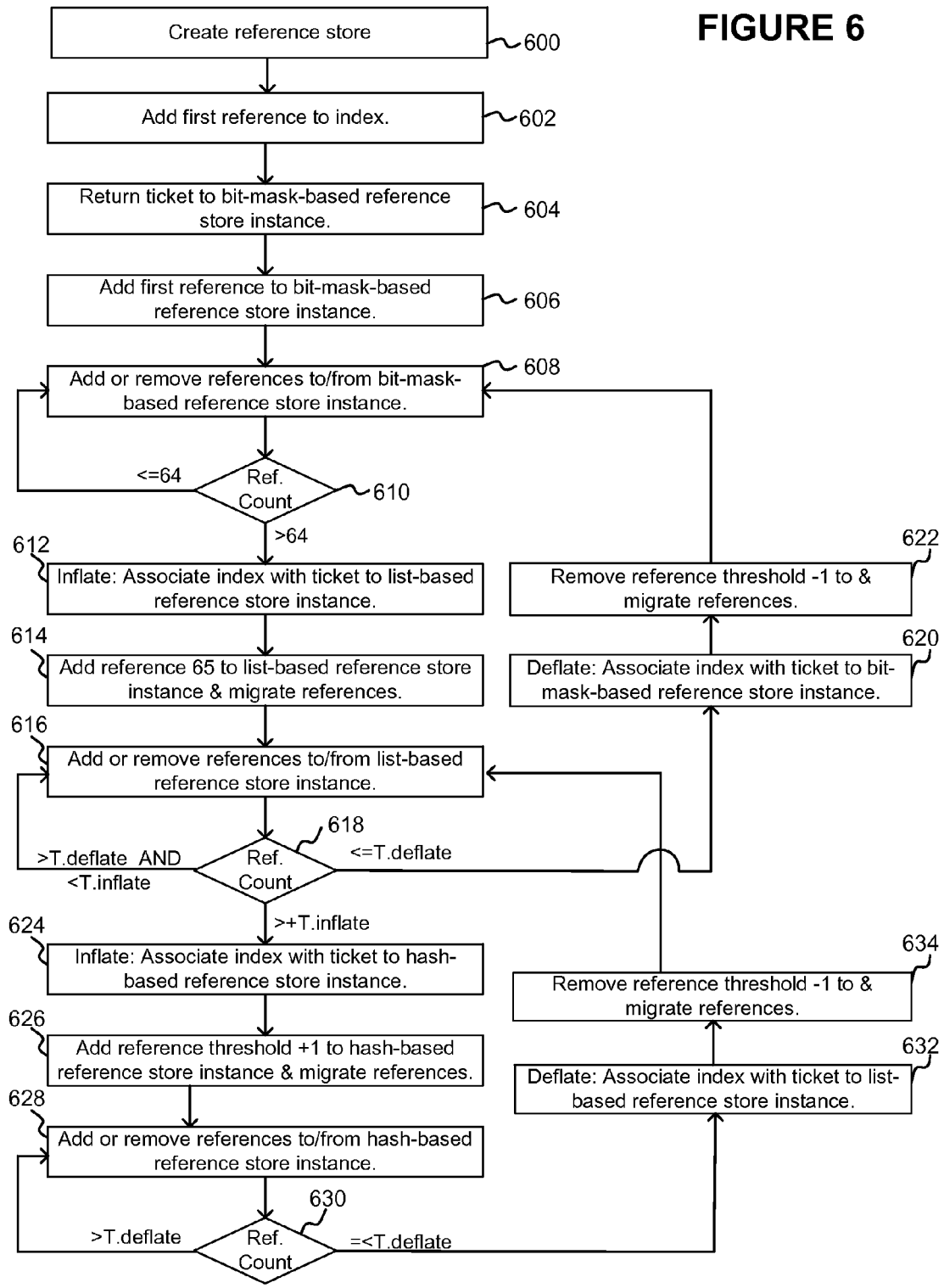
FIG. 6 illustrates reference store methods in a distributed computing environment, in accordance with an embodiment of the invention.

FIG. 6 illustrates a method of using a reference store to store references for an index according to an embodiment of the invention. The same method is performed for each of the plurality of indices services by the reference store. At step 600 the method starts and a reference store is created which implements a contract with indices requiring to store references. At step 602, an index attempts to store a first reference. When the first reference is added a bit-mask based reference store is created and used. At step 604, the reference store associates the index with a ticket to the bit-mask based reference store instance and returns the ticket to the referrer. At step 606, the first reference is stored in the bit-mask based reference store instance. At step 608, references are added to or removed from the bit-mask based reference store instance by the index. At step 610, if the reference count would be <=64 after adding or removing a reference, the method returns to step 608—i.e. the bit-mask-based reference store instance continues to be used for references. At step 610, if a sixty fifth reference is attempted to be added, the method moves to step 612 to inflate the reference store instance.

At step 612, the reference store instance associated with the index is inflated. The reference store associates a new ticket with the index and the new ticket refers to a list-based reference store instance. Alternatively, the list may be inflated directly to a hash-based reference store (step 624) and the list-based reference store only used upon deflation from the hash-based reference store. At step 614, reference 65 is added to the list-based reference store instance and the other 64 references are migrated over to the list-based reference store instance. At step 616, references are added to or removed from the list-based reference store instance by the index. At step 618, if the reference count is greater than a deflation threshold AND less than an inflation threshold the method returns to step 616, i.e. the list-based reference store instance continues to be used for storing references for the index.

At step 618, if the reference count is less than or equal to a deflation threshold, the method moves to step 620 to deflate the reference store instance. Deflation requires for at least 75% of wastage to occur in the reference store, or 25% or less references compared to total slots in the reference store. There is also compensation for initial usage thus deflation does not to occur until usage stabilizes. At step 618, if the reference count is greater than or equal to an inflation threshold, the method moves to step 624 to inflate the reference store instance.

At step 620, deflating the list-based reference store includes associating the index with a ticket to a bit-mask based reference store instance. At step 622, the references are migrated from the list-based reference store instance to the bit-mask-based reference store instance. The method then returns to step 608 where references can be added or removed from the bit-mask based reference store instance. The threshold for deflating from the list-based reference store to the bit-mask-based reference store can be for example 80% of the threshold for inflating from the bit-mask-based reference store to the list-based reference store to prevent excessive migration cycling.

At step 624, inflating the list-based reference store instance includes associating the index with a ticket to a hash-based reference store instance. At step 626, the reference (over the inflation threshold) is added to the hash-based reference store instance and the already stored references are migrated to the hash-based reference store instance. At step 628, references can be added or removed from the hash-based reference store instance associated with the ticket. At step 630, if the reference count is greater than a deflation threshold, the method moves to step 628, i.e. the index continues to use the hash-based reference store instance associated with the ticket to store references. Note no inflation is possible as the has-based reference store is the largest store used. At step 630, if the reference count is less than or equal to a deflation threshold, the method moves to step 632 to deflate the reference store instance. Deflation requires for at least 75% of wastage to occur in the reference store, or 25% or less references compared to total slots in the reference store. There is also compensation for initial usage thus deflation does not to occur until usage stabilizes to prevent excessive migration cycling.

At step 632, deflating the hash-based reference store instance includes associating the index with a ticket to a list-based reference store instance. At step 634, the reference (below the threshold) is removed and the remaining references are migrated to the list-based reference store instance. The method then returns to step 616 where the index can add or remove references form the list-based reference store instance associated with the ticket.

While various embodiments of the present invention have been described above, it should be understood that they have been presented by way of example, and not limitation. It will be apparent to persons skilled in the relevant art that various changes in form and detail can be made therein without departing from the spirit and scope of the invention.

Many features of the present invention can be performed in, using, or with the assistance of hardware, software, firmware, or combinations thereof. The present invention may be conveniently implemented using one or more conventional general purpose or specialized digital computer, computing device, machine, or microprocessor, including one or more processors, memory and/or computer readable storage media programmed according to the teachings of the present disclosure. Features of the invention may also be implemented in hardware using, for example, hardware components such as application specific integrated circuits (ASICs) and programmable logic device. Implementation of the hardware state machine so as to perform the functions described herein will be apparent to persons skilled in the relevant art.

Features of the present invention can be incorporated in software and/or firmware for controlling the hardware of a processing system, and for enabling a processing system to interact with other mechanisms utilizing the results of the present invention. Such software or firmware may include, but is not limited to, application code, device drivers, operating systems and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In embodiments, the storage medium or computer readable medium can be non-transitory.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting key management in a distributed computing environment, the method comprising:
   providing a binary radix tree comprising a plurality of nodes which intern a plurality of binary keys;
   serializing the binary radix tree to a buffer;
   providing an interface to the buffer, wherein the interface is configured to provide a plurality of references, wherein each reference of the plurality of references is associated with a node of the binary radix tree and with a binary key of the plurality of binary keys; and
   providing said plurality of references to a plurality of referrers whereby the plurality of referrers are enabled to realize the plurality of binary keys from the plurality of references without maintaining copies of the plurality of binary keys.

2. The method of claim 1, further comprising:
   providing a plurality of satellite nodes in the binary radix tree wherein the plurality of satellite nodes are augmented with information indicative of their position in the binary radix tree.

3. The method of claim 1, further comprising:
   providing a plurality of satellite nodes in the binary radix tree wherein the plurality of satellite nodes are augmented with position information indicative of their position in the binary radix tree; and
   using the position information encoded in satellite nodes to improve efficiency of traversal of the binary radix tree.

4. The method of claim 1, wherein providing an interface to the buffer, wherein the interface is configured to provide a plurality of references, wherein each reference of the plurality of references is associated with a node of the binary radix tree and with a binary key of the plurality of binary keys comprises:
   providing a byte sequence interface to the buffer, wherein the byte sequence interface is configured to provide a plurality of references, wherein each reference of the plurality of references is associated with a location of node of the binary radix tree in said byte sequence interface and with a binary key of the plurality of binary keys.

5. The method of claim 1, wherein providing an interface to the buffer, wherein the interface is configured to provide a plurality of references, wherein each reference of the plurality of references is associated with a node of the binary radix tree and with a binary key of the plurality of binary keys comprises:
   providing a byte sequence interface to the buffer, wherein the byte sequence interface is configured to provide a plurality of references, wherein each reference of the plurality of references is associated with a location of node of the binary radix tree in said byte sequence interface and with a binary key of the plurality of binary keys; and
   supporting a byteAt(n) method with the byte sequence interface where the byteAt(n) method returns a byte at the an nth position in the byte sequence.

6. The method of claim 1, wherein providing an interface to the buffer, wherein the interface is configured to provide a plurality of references, wherein each reference of the plurality of references is associated with a node of the binary radix tree and with a binary key of the plurality of binary keys comprises:
   providing a byte sequence interface to the buffer, wherein the byte sequence interface is configured to provide a plurality of references, wherein each reference of the plurality of references is associated with a location of node of the binary radix tree in said byte sequence interface and with a binary key of the plurality of binary keys; and
   supporting a length method with the byte sequence interface wherein the length method can determine the number of bytes of data represented in a node of the byte sequence.

7. The method of claim 1, wherein:
   the plurality of referrers comprise plurality of reverse indices and wherein each reverse index comprises a set of references.

8. The method of claim 1, wherein:
   the plurality of referrers comprise plurality of reverse indices and wherein each reverse index comprises a set of references; and
   whereby each reverse index has reduced memory overhead compared to maintain a set of binary keys.

9. The method of claim 1, further comprising:
   associating each node in the binary radix tree with an address for a value associated with a key associated with the node.

10. The method of claim 1, further comprising:
    providing a long storage array holding a plurality of addresses for values associated with the plurality of keys; and associating each node in the binary radix tree with a slot in the long storage array and thereby associating each node with an address for a value associated with a key associated with the node.

11. A system for supporting key management in a distributed computing environment, the system comprising:
a computer system comprising a microprocessor and a memory;
a server node of said distributed computing environment operating on said computer system; and
wherein the server node is configured to,
provide a binary radix tree comprising a plurality of nodes which intern a plurality of binary keys;
serialize the binary radix tree to a buffer in memory of said computer system allocated to said node;
provide an interface to the buffer, wherein the interface is configured to provide a plurality of references, wherein each reference of the plurality of references is associated with a node of the binary radix tree and with a binary key of the plurality of binary keys, and
provide said plurality of references to a plurality of referrers whereby the plurality of referrers are enabled to realize the plurality of binary keys from the plurality of references without maintaining copies of the plurality of binary keys.

12. The system of claim 11, wherein the server node is further configured to provide a plurality of satellite nodes in the binary radix tree, wherein the plurality of satellite nodes are augmented with information indicative of their position in the binary radix tree.

13. The system of claim 11, wherein the server node is further configured to:
provide a plurality of satellite nodes in the binary radix tree wherein the plurality of satellite nodes are augmented with position information indicative of their position in the binary radix tree; and
use the position information encoded in satellite nodes to improve efficiency of traversal of the binary radix tree.

14. The system of claim 11, wherein the interface to the buffer comprises:
a byte sequence interface to the buffer, wherein the byte sequence interface is configured to provide a plurality of references, wherein each reference of the plurality of references is associated with a location of node of the binary radix tree in said byte sequence interface and with a binary key of the plurality of binary keys.

15. The system of claim 11, wherein the interface to the buffer comprises:
a byte sequence interface to the buffer, wherein the byte sequence interface is configured to provide a plurality of references, wherein each reference of the plurality of references is associated with a location of node of the binary radix tree in said byte sequence interface and with a binary key of the plurality of binary keys; and
wherein the byte sequence interface is configured to support a byteAt(n) method with the byte sequence interface where the byteAt(n) method returns a byte at the an nth position in the byte sequence.

16. The system of claim 11, wherein the interface to the buffer comprises:
a byte sequence interface to the buffer, wherein the byte sequence interface is configured to provide a plurality of references, wherein each reference of the plurality of references is associated with a location of node of the binary radix tree in said byte sequence interface and with a binary key of the plurality of binary keys; and
wherein the byte sequence interface is configured to support a length method with the byte sequence interface wherein the length method can determine the number of bytes of data represented in a node of the byte sequence.

17. The system of claim 11, wherein:
the plurality of referrers comprise plurality of reverse indices and wherein each reverse index comprises a set of references; and
whereby each reverse index has reduced memory overhead compared to maintain a set of binary keys.

18. The system of claim 11, wherein each node in the binary radix tree is associated with an address for a value associated with a key associated with the node.

19. The system of claim 11, further comprising:
a long storage array holding a plurality of addresses for values associated with the plurality of keys; and
wherein each node in the binary radix tree is associated with a slot in the long storage array and thereby associated with an address for a value associated with a key associated with the node.

20. A non-transitory computer readable medium including instructions stored thereon for supporting key management in a distributed computing environment, which instructions, when executed, cause a node in the distributed computing environment to perform steps comprising:
providing a binary radix tree comprising a plurality of nodes which intern a plurality of binary keys;
serializing the binary radix tree to a buffer;
providing an interface to the buffer, wherein the interface is configured to provide a plurality of references, wherein each reference of the plurality of references is associated with a node of the binary radix tree and with a binary key of the plurality of binary keys; and
providing said plurality of references to a plurality of referrers whereby the plurality of referrers are enabled to realize the plurality of binary keys from the plurality of references without maintaining copies of the plurality of binary keys.

* * * * *

UNITED STATES PATENT AND TRADEMARK OFFICE
CERTIFICATE OF CORRECTION

PATENT NO. : 9,886,450 B2  
APPLICATION NO. : 14/865666  
DATED : February 6, 2018  
INVENTOR(S) : Raja et al.

Page 1 of 1

It is certified that error appears in the above-identified patent and that said Letters Patent is hereby corrected as shown below:

On the Title Page

Column 2, item (57), under Abstract, Line 8, delete "copes" and insert -- copies --, therefor.

In the Specification

In Column 11, Line 14, delete ""0xb381 efd0"." and insert -- "0xb381efd0". --, therefor.

In Column 16, Line 27, delete "implmentations" and insert -- implementations --, therefor.

In Column 19, Lines 24 - 25, delete "node/JVM." and insert -- JVM/node. --, therefor.

Signed and Sealed this  
Twenty-eighth Day of August, 2018

Andrei Iancu  
*Director of the United States Patent and Trademark Office*